United States Patent
Mengerink et al.

(10) Patent No.: US 7,877,295 B2
(45) Date of Patent: Jan. 25, 2011

(54) SYSTEM AND METHOD FOR TRANSACTION AUTOMATION

(75) Inventors: Matthew Mengerink, San Jose, CA (US); Kiran Reddy, Fremont, CA (US)

(73) Assignee: eBay Inc., San Jose, CA (US)

(\*) Notice: Subject to any disclaimer, the term of this patent is extended or adjusted under 35 U.S.C. 154(b) by 485 days.

(21) Appl. No.: 11/286,600

(22) Filed: Nov. 23, 2005

(65) Prior Publication Data

US 2007/0118434 A1    May 24, 2007

(51) Int. Cl.
G06Q 30/00    (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | |
|---|---|---|---|
| 5,963,925 A * | 10/1999 | Kolling et al. ................. 705/40 |
| 6,141,006 A * | 10/2000 | Knowlton et al. .............. 705/26 |
| 6,535,888 B1 | 3/2003 | Vijayan et al. | |
| 6,925,444 B1 | 8/2005 | McCollom et al. | |
| 7,034,953 B2 | 4/2006 | Silverbrook et al. | |
| 7,043,447 B2 | 5/2006 | Hughes et al. | |
| 7,188,081 B1 | 3/2007 | Shah | |
| 7,197,475 B1 * | 3/2007 | Lorenzen et al. .............. 705/26 |
| 7,328,176 B2 * | 2/2008 | Tarvydas et al. .............. 705/26 |
| 2002/0052806 A1 * | 5/2002 | Hodson et al. ................ 705/27 |
| 2002/0099622 A1 | 7/2002 | Langhammer | |
| 2002/0133414 A1 * | 9/2002 | Pradhan et al. ............... 705/26 |
| 2003/0105710 A1 * | 6/2003 | Barbara et al. ................ 705/39 |
| 2003/0210279 A1 | 11/2003 | Masuda | |
| 2004/0254855 A1 * | 12/2004 | Shah ............................ 705/26 |
| 2006/0190389 A1 | 8/2006 | Molloy et al. | |
| 2007/0100706 A1 | 5/2007 | Raccah et al. | |

FOREIGN PATENT DOCUMENTS

| WO | WO-2007062185 A2 | 5/2007 |
| WO | WO-2007062185 A3 | 5/2007 |

OTHER PUBLICATIONS

*Microsoft Computer Dictionary, definition of Shopping Cart, Fifth Edition*, circa 2002, 2 pages.

"Agile Shopping Cart From Eastland", [Online]. Retrieved from the Internet: <URL:http://www.eastland.com/livecart/prodpage.cfm?Cat_Selected=1&SubCat_Selected=1&Product_Selected=EDS-ISWJ-4.0&StartRow=1>, (Jun. 14, 2007), 1 pg.

"Building a Drag-and-Drop Shopping Cart with AJAX", [*Online*]. Retrieved from the Internet: <URL:http://br.sys-con.com/read/172585_p.htm>, 5 pgs.

"Drag and Drop Shopping Cart", [Online]. Retrieved from the Internet: <URL:http://students.cs.byu.edu/~jkrein/ajax_lab/ajax_cart.php>, (Jun. 14, 2007), 1 pg.

(Continued)

*Primary Examiner*—Robert M. Pond
(74) *Attorney, Agent, or Firm*—Schwegman, Lundberg & Woessner, P.A.

(57) ABSTRACT

A system and method provides a user of a network-based commerce system drag and drop functionality that allows a user to purchase goods from a network-based transaction system through the use of links and images.

29 Claims, 7 Drawing Sheets

OTHER PUBLICATIONS

"International Application Serial No. PCT/US2006/045317 International Search Report and Written Opinion Mailed on Jun. 18, 2008", p. 220, 9 pgs.

Azamsharp, "Browser Compatible Drag and Drop Shopping Cart", [Online]. Retreived from the Internet: <URL:http://gridviewguy.com/articledetails.aspx?articleid=236>, (Jun. 14, 2007), 10 pgs.

U.S Appl. No. 10/791,156, Final Office Action mailed Jun. 5, 2009, 11 pgs.

U.S. Appl. No. 11/323,859, Non Final Office Action Mailed Oct. 1, 2009, 15 pgs.

U.S Appl. No. 10/791,156, Response filed Sep. 15, 2009 to Final Office Action mailed Jun. 15, 2009, 9 pgs.

"U.S. Appl. No. 10/791,156, Advisory Action mailed Feb. 28, 2006", 3 pgs.

"U.S. Appl. No. 10/791,156, Advisory Action mailed Mar. 21, 2007".

"U.S. Appl. No. 10/791,156, Final Office Action mailed Jan. 8, 2007", 7 pgs.

"U.S. Appl. No. 10/791,156, Final Office Action mailed Nov. 30, 2005", 9 pgs.

"U.S. Appl. No. 10/791,156, Final Office Action mailed Dec. 28, 2009", 16 Pgs.

"U.S. Appl. No. 10/791,156, Non-Final Office Action mailed Jun. 3, 2005", 10 pgs.

"U.S. Appl. No. 10/791,156, Non-Final Office Action mailed Jun. 13, 2006", 9 pgs.

"U.S. Appl. No. 10/791,156, Response filed Jan. 30, 2006 to Final Office Action mailed Sep. 30, 2005", 10 pgs.

"U.S. Appl. No. 10/791,156, Response filed Mar. 8, 2007 to Final Office Action mailed Jan. 8, 2007", 11 pgs.

"U.S. Appl. No. 10/791,156, Response filed Sep. 6, 2005 to Non-Final Office Action mailed Jun. 3, 2005", 9 pgs.

"U.S. Appl. No. 10/791,156, Response filed Oct. 13, 2006 to Non-Final Office Action mailed Jun. 3, 2005", 11 pgs.

"U.S. Appl. No. 11/323,859, Response filed Jan. 4, 2010 to Non Final Office Action mailed Oct. 1, 2009", 18 pgs.

* cited by examiner

| TRANSACTION_RECORD TABLE | | | | | | |
|---|---|---|---|---|---|---|
| TRANSACTION ID | END DATE | PURCHASER (USER ID) | SELLER (USER ID) | ITEM NO# | TITLE | FEEDBACK |
| | | | | | | |
| 62 | 64 | 66 | 68 | 70 | 72 | 73 |

*FIG. 3*

SYSTEM AND METHOD FOR TRANSACTION AUTOMATION

TECHNICAL FIELD

Various embodiments relate generally to the fields of transaction automation, and in particular, but not by way of limitation, to a system and method for drag and drop desktop shopping.

BACKGROUND

The Internet and the World Wide Web provide access to a tremendous amount of products and information at the click of a mouse. A consumer can therefore shop for goods on any E-commerce site on the World Wide Web. Such E-commerce sites permit a user to log on to the site, shop for goods and services online, add the goods and services desired to be purchased into an electronic shopping cart, submit the order to the E-commerce system's server, and have the goods delivered to the user. However, as convenient as on-line shopping is, a user who would like to shop for and purchase goods at more than one E-commerce site must go through the entire login and purchase procedures for each separate E-commerce site. Consequently, on line shopping, as convenient as it is, still is in need of improvement.

BRIEF DESCRIPTION OF THE DRAWINGS

Example embodiments of the present invention are illustrated by way of example and not limitation in the figures of the accompanying drawings, in which like references indicate similar elements and in which:

FIG. 3 is a diagrammatic representation of an example transaction record table of the database illustrated in FIG. 2;

DETAILED DESCRIPTION

A system and method for commerce automation are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction System

Figure 1:
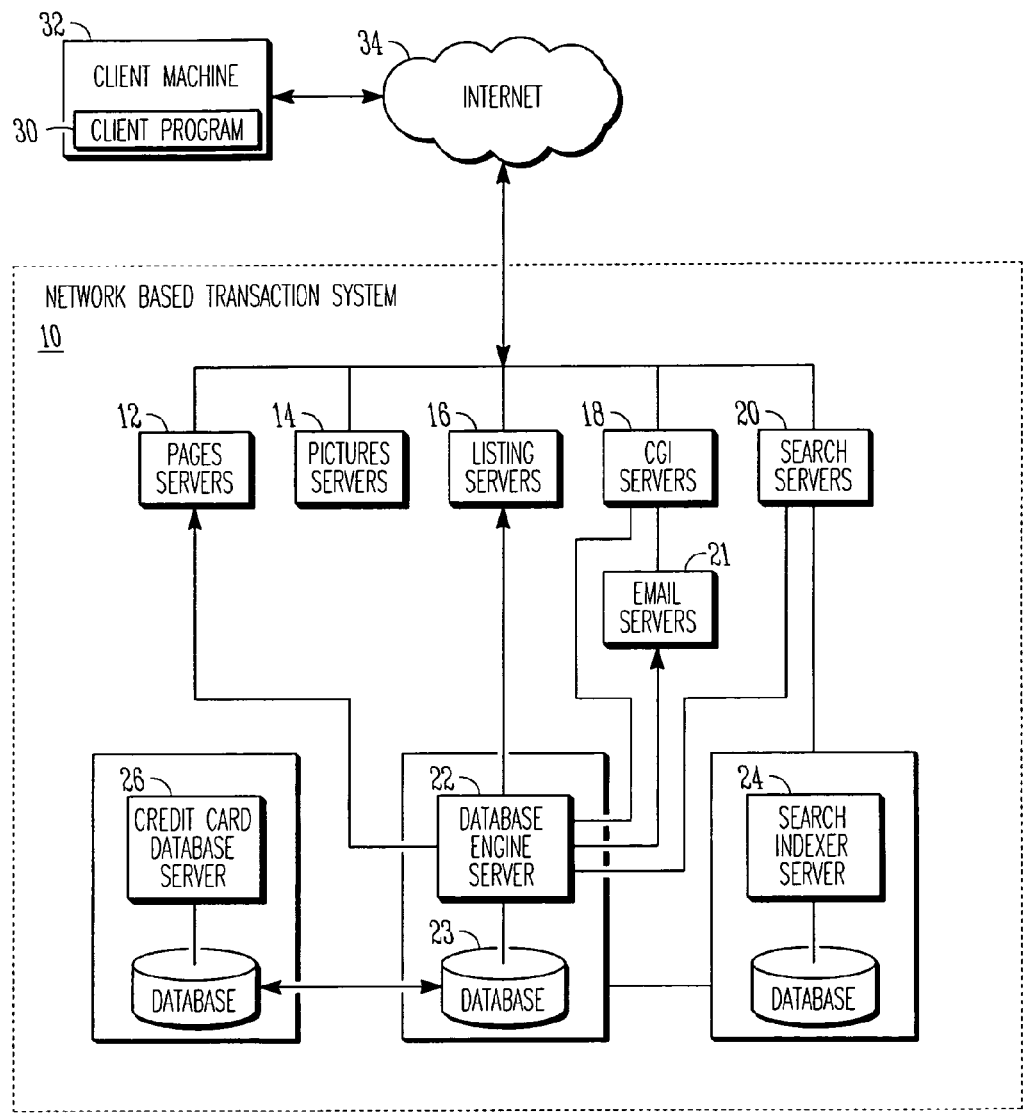
FIG. 1 is a block diagram illustrating an example network-based transaction system.

FIG. 1 is block diagram illustrating an example network-based transaction system 10 that includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of the system 10, and search servers 20 that handle search requests to the system 10. E-mail servers 21 provide, inter alia, automated e-mail communications to users of the system 10.

The back-end servers include a database engine server 22, a search index server 24 and a credit card database server 26, each of which maintains and facilitates access to a respective database 23.

The system 10 may be accessed by a client program 30, such as a browser (e.g., the Internet Explorer distributed by Microsoft Corp. of Redmond, Wash.) that executes on a client machine 32 and accesses the system 10 via a network such as, for example, the Internet 34. Other examples of networks that a client may utilize to access the network-based transaction system 10 include a wide area network (WAN), a local area network (LAN), a wireless network (e.g., a cellular network), or the Plain Old Telephone Service (POTS) network.

Database Structure

Figure 2:
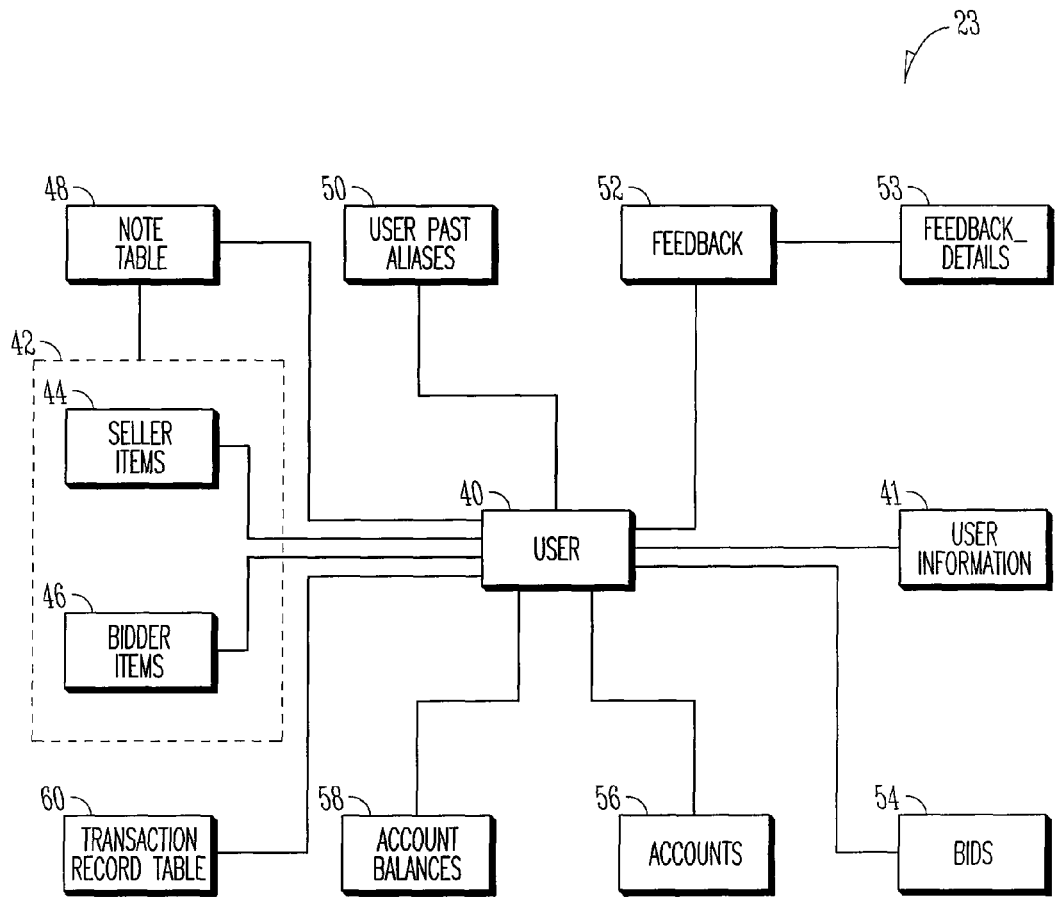
FIG. 2 is a database diagram illustrating an example database for the transaction system.

FIG. 2 is a database diagram illustrating an example database 23, maintained by and accessed via the database engine server 22, which at least partially implements and supports the network-based transaction system 10 such as an Internet-based auction system, an E-commerce system, a network-based payment service provider, and/or a network-based publication system.

The database 23 may, in one embodiment, be implemented as a relational database, and may include a number of tables having entries, or records, that are linked by indices and keys. In an alternative embodiment, the database 23 may be implemented as a collection of objects in an object-oriented database.

Central to the database 23 is a user table 40, which contains a record for each user of the network-based transaction system 10. A user may operate as a seller, a buyer, or both, within the system 10. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the system 10. A link indicates whether the user is a seller or a buyer with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being offered via the system 10, or to a user of the system 10.

A number of other tables are also shown to be linked to the user table 40, namely a user past aliases table 50, a feedback table 52, a feedback details table 53, a bids table 54, an accounts table 56, an account balances table 58, a user information table 41 and a transaction record table 60.

FIG. 3 is a diagrammatic representation of an example embodiment of the transaction record table 60 that is populated with records, or entries, for completed, or ended, transactions that have been facilitated by the system 10. The table 60 includes a transaction identifier column 62 that stores a unique transaction identifier for each entry, and an end date column 64 that stores a date value indicating, for example, a date on which a transaction was established. A purchaser column 66 stores a user identifier for a purchaser, the user identifier comprising a pointer to further user information stored in the user table 40. Similarly, a seller column 68 stores, for each entry, a user identifier for a seller within the relevant transaction. An item number column 70 stores, for each entry, an item number identifying the goods or service being transacted, and a title column 72 stores, for each entry, a descriptive title for the relevant transaction or for the item being transacted. A feedback column 73 stores, for each entry, data specifying whether feedback exists for the relevant transaction and whether this feedback is current (i.e., has not been removed or withdrawn).

It should be noted that, in one embodiment, an entry is only created in the transaction record table 60 for transactions that have been established by some offer and acceptance mechanism between the purchaser and the seller.

Figure 4:
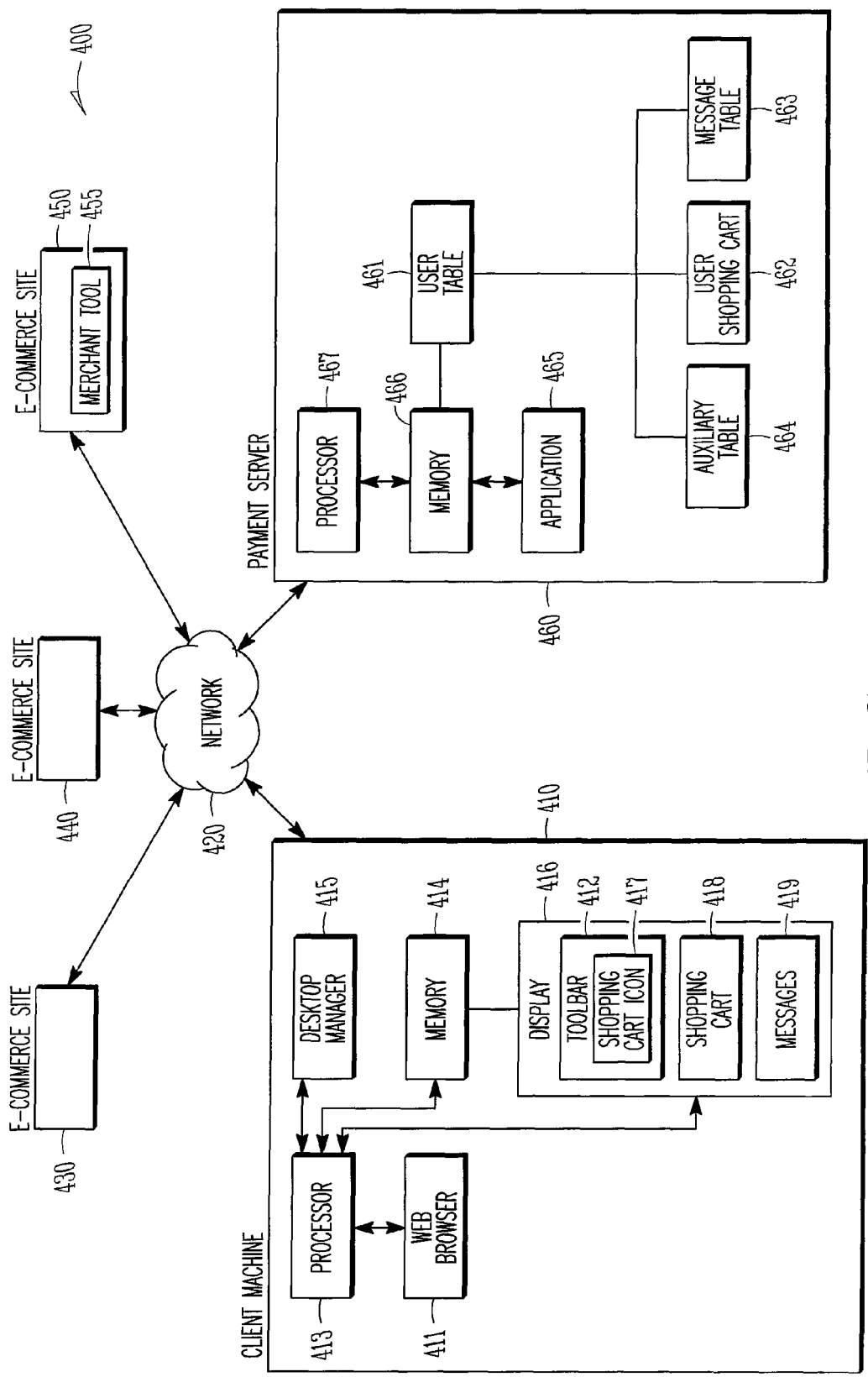
FIG. 4 is a block diagram illustrating an example network-based transaction system.

FIG. 4 illustrates an embodiment of a network-based transaction system 400. In an implementation of the embodiment illustrated in FIG. 4, a person may log onto a network-based transaction site, and click on and drag offering description information (e.g., an image) associated with an offering identifier (e.g., a link) to an icon on an application (e.g., a toolbar or other browser plug-in) on the user's machine. The icon may be image-based, alphanumeric-based, or a combination of image and alphanumeric information. A desktop manager program on the client machine causes a message to be sent to a payment server. The payment server authorizes payment for the item, and sends a confirmation message to the client and the network-based transaction site informing them that the payment has been authorized and the transaction completed. In another embodiment, a person may, in succession, browse several network-based transaction sites, select items from one or more of those sites for possible purchase, and have offering identifier information for those items stored on the user's machine. Thereafter, the user may view and manipulate those items on the client machine, and purchase one or more of those items with the single click of a mouse. While these embodiments will be described in connection with the purchase of items from E-commerce sites, it should be noted that these embodiments are not limited to the purchase of goods from E-commerce sites, but may also apply to the access of any network-based server sites via an application on a client machine, any peer-to-peer system, or any other system architecture.

Referring now specifically to FIG. 4, a system embodiment 400 includes a client side machine 410. The client machine 410 includes a processor 413, a memory 414, a web browser 411, a desktop manager 415, and a display 416. The client machine 410 is connected to a network 420, such as the Internet. The web browser 411 permits a user of the client machine 410 to access and browse server sites. In an embodiment, the web browser 411 includes a toolbar 412 on the display 416. In another embodiment, the toolbar 412 may be provided by an external application in lieu of the web browser 411. The desktop manager 415 may perform several functions including displaying a shopping cart icon 417 on the toolbar 412 on the display unit 416, displaying a set of instructions on the functions associated with the icon 417, displaying a shopping cart window 418 listing items in a user's shopping cart (e.g., items that a user has indicated a desire to purchase from various websites), communicating requests and receiving replies over the network 420 to and from server sites connected to the network, and displaying messages 419 from a server website. In an embodiment, the instructions associated with the icon are displayed when a cursor is placed over the icon 417. In another embodiment, responsive to clicking the icon, the shopping cart window 418 may be displayed listing the items that the user has selected from one or more websites for possible purchase.

The system embodiment 400 of FIG. 4 further includes a multitude of servers 430, 440, 450, and 460 connected to the network 420. Many more servers could be coupled to the network, but for purposes of ease of illustration, only four are illustrated in FIG. 4. As is well known in the art, the client machine 410 may access any one of these server sites 430, 440, 450, 460 by communicating a message in the proper protocol over the network 420 with the message containing the network address of one of the servers 430, 440, 450, 460. In at least one embodiment, a server site such as server site 460 in FIG. 4 includes a payment service that a user on the client machine 410 may use to pay for goods ordered on any of the sites 430, 440, 450, or 460. In this embodiment, the payment server 460 includes a user table 461, a user shopping cart table 462, a message table 463, and an auxiliary table 464. The payment server 460 further may include an application 465, a memory 466, and a processor 467. The application 465 executing on the processor 467 implements functions on the server 460 associated with the desktop manager 415 on the client machine 410 as will be described in detail infra.

Figure 6:
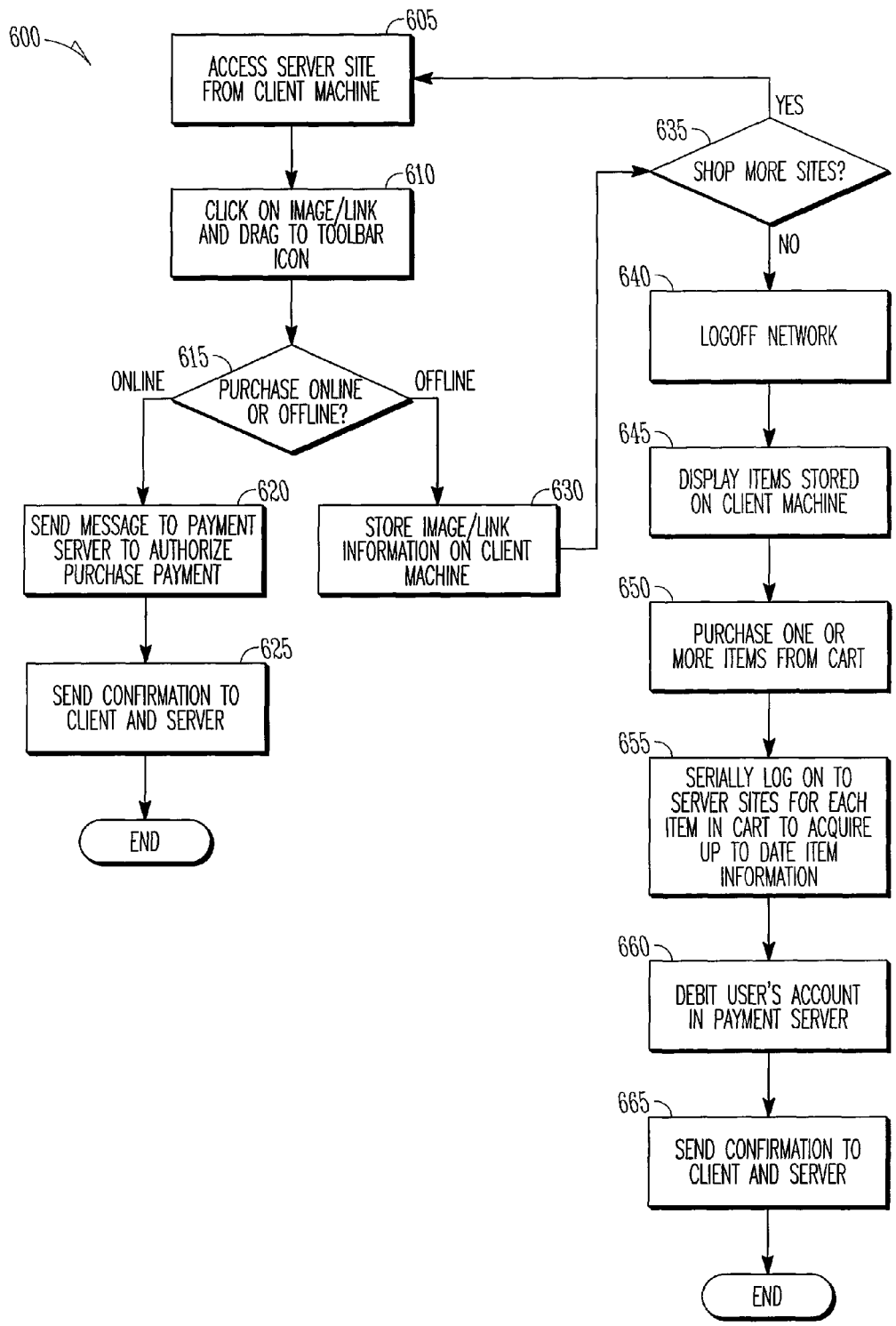
FIG. 6 illustrates a flowchart of a method that may be used in connection with the network-based transaction system of FIG. 4, according to an embodiment.

FIG. 6 illustrates an embodiment of a method 600 that may be used in conjunction with the system of FIG. 4. In the embodiment of FIG. 6, a user, through client machine 410 and web browser 411, may access at 605 a server (430, 440, 450, or 460) connected to the network 420. If the server is an E-commerce site, the user can search that site for products that the user may want to buy. Specifically, the E-commerce site may display images of items that are for sale on that site. As is known in the art, the images displayed on a client machine have information that is associated with them, and that is available to the client machine. One piece of information that is associated with that image is the URL link of that image. In the case of an item for sale, other pieces of information may be available through the link/image such as the identity of the merchant selling the item, the price of the item, and other information about the merchant and the item. If the user decides to purchase the item represented by the image, the user simply clicks on and drags that image at operation 610 to the shopping cart icon 417 in the toolbar 412. By clicking and dragging the image to the shopping cart icon 417, all the information that is associated with that product via the image and the URL link is made available to the desktop manager 415. The embodiment of FIG. 6 includes online and offline functionalities (decision operation 615). In the embodiment that includes the offline functionality, the desktop manager 415 stores that information about the product in memory 414 on the client's machine at 630. In this embodiment, dragging the image to the icon 417 causes the desktop manager 415 to open up the shopping cart window 418 on the display 416. The desktop manager 415 displays the shopping cart window 418 including the item that was just added to the cart by dragging the image onto the desktop icon 417. The shopping cart window 418 may also display items that have previously been added to the shopping cart, either from the current E-commerce site or different E-commerce sites. While a user is connected to the network 420, he is given the option at operation 635 to visit multiple E-commerce sites in succession. The desktop manager 415 stored these previously added items in the memory 414, and the desktop manager can retrieve these items and display them in the shopping cart 418.

Figure 5:
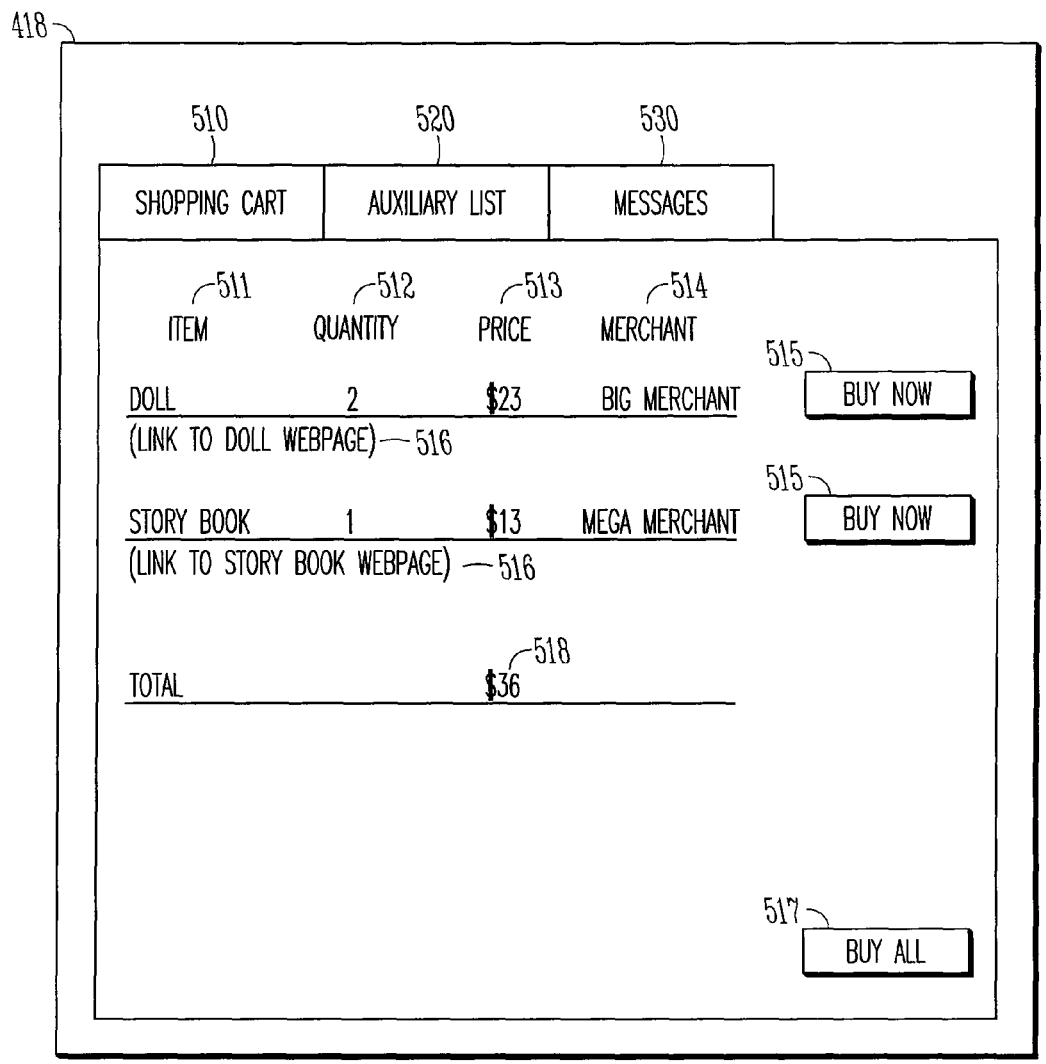
FIG. 5 illustrates an example user interface for the network-based transaction system of FIG. 4.

FIG. 5 illustrates a user interface displaying a user's shopping cart 418 that may be displayed on the client machine's by the desktop manager 415, according to an embodiment. This shopping cart 418 displays the items that a user has dragged and dropped from one or more E-commerce sites. The shopping cart 418 includes a shopping cart display button 510, an auxiliary display button 520, and a messages display button 530. As is well known in the art, a user may move from one display or window to another by clicking on the buttons 510, 520, or 530. To bring up the shopping cart window 418 as illustrated in FIG. 5, a user may click on the shopping cart icon 417 in the toolbar 412 (not shown), the user may drag and drop an image from an E-commerce site onto the shopping cart icon in the tool bar, or the user may click on the shopping cart button 510 prompting the desktop manager 415 to open up the shopping cart 418. The shopping cart 418 then displays the items 511 that have been placed in the cart, the quantity 512 of each item, the price 513 of each item, the merchant 514 from which each may be purchased, and the total price 518 of all the items in the cart. In an embodiment, displayed under each item is a link 516 that may be selected to access the corresponding item 511 on the site of the merchant 514. This link information may have been saved on the client machine 410 responsive to the user accessing the merchant site 430, 440, 450 and dragging the image to his shopping cart icon 417 on the tool bar 412. The user may click on this link in the shopping cart 418 to return to the merchant site 430, 440, 450 to find out additional information about the product. The shopping cart 418 further includes a button 515 that is associated with each item in the list. By clicking on the button 515, the user may purchase the corresponding item (without having to return to the E-commerce web site from which it was selected). The shopping cart 418 is further illustrated with a button 517 that enables the user to purchase all items in the cart, irrespective of the merchant offering the item, and without having to revisit the merchant site, responsive to a single click of the button 517.

Specifically, after a user logs off the network at operation 640, the user retrieves his shopping cart from memory 414 via one of the aforementioned methods, and the desktop manager displays the contents of his cart (operation 645). The user may then indicate that he may like to purchase an item or items in the cart at operation 650, the desktop manager 415 causes the client machine 410 to access the network 420 and serially log onto each respective site for each respective item to acquire the latest data on that item (operation 655). This data may indicate whether an item is currently in stock, and the current price for the item. After checking the appropriate sites for all items, the user may be informed of the availability of the item, the current price of the item, and asked if he would like to purchase the item. If the user indicates that he would like to make the purchase, his account in the user table 461 on the payment server 460 may be accessed and debited accordingly at operation 660, and a confirmation may be sent to both the client machine 410 and the E-commerce site 430, 440, 450 at operation 665.

In the embodiment with the online functionality, a user on a client machine 410 accesses an E-commerce site at operation 605. If the user decides to purchase an item on that site, at operation 610 the user clicks on the image for that item, and drags the item to his shopping cart 417 on the toolbar 412. This causes the desktop manager 415 to communicate a message to the payment server 460 that authorizes payment for the item at operation 620. After the payment server 460 authorizes payment for the item, the payment server, at operation 625, may communicate a confirmation message to the client machine 410 and the E-commerce server (430, 440, 450).

Referring back to FIG. 5, the auxiliary button 520 enables a user to view items that the user has moved from his shopping cart 418 to an auxiliary cart of goods for which the user would like to postpone purchasing. If the user decides to purchase one or more goods on that list at some time in the future, the user can drag the item or items back to the shopping cart 418, and purchase those items by clicking on button 515 or 517.

FIG. 5 further illustrates a messages button 530. By clicking on the messages button 530, the user may view messages from a web site such as the payment site 460. When a user clicks on the messages button, a request may be sent by the desktop manager 415 through the network 420 to the payment server 460 prompting the payment server 460 to communicate message identifiers associated with messages associated with this user to the client machine 410. The message identifiers may be displayed in the message window 419 similar to a conventional email program. Then, when a user clicks on a message in the message list, a message may be communicated from the client machine 410 to the payment server 460 to retrieve the identified message for the user. The message system may include not only messages from the administrator of the payment server 460, but also may contain advertisements and buyer alert messages from merchants that are submitted to the payment server by a merchant. In an embodiment, an E-commerce site is provided with a software tool 455 that permits the E-commerce site to generate and transmit such advertisements and/or buyer alerts to the payment server 460. The payment server 460 may then associate such messages with one or more users in the user table 461. In this embodiment, an example of a buyer alert is the notification of a user by an E-commerce site that a previously out of stock item is now in stock. For example an E-commerce site may advertise a 50% off liquidation sale. In another embodiment, the user may be allowed to opt out of such advertisements and buyer alerts. One advantage of this messaging system is that it is a private system, and users may be assured that the described messages originated from the server site, and not from another party in an attempt to defraud the user.

As disclosed supra, a user may visit multiple E-commerce sites (e.g., 430, 440, 450, 460) and, by dragging an image to the shopping cart icon 417 on his toolbar 412, move an item from an E-commerce site to the shopping cart 418 on the buyer's client machine 410. The desktop manager 415 may store the item in shopping cart 417 in memory 414. Then, after visiting multiple sites, the user may retrieve the shopping cart 418 from the memory 414 (by clicking on the shopping cart icon 417) and view the contents of his shopping cart 418 offline. In another embodiment, when a user logs off the network 420, the payment server 460 may inquire as to whether the user would like to save the contents of shopping cart 418 in a shopping cart database 462 on the third party payment system 460. If the user decides to save the contents in the third party shopping cart 462, the user is not dependent on the memory 414 on his client machine 410, and may then access his offline shopping cart 462 (or the auxiliary cart 464 or the message table 463) on the server 460 from any other client machine 410 that may be connected to the network. Thereafter, the user may examine his shopping cart 418 using either the version stored in memory 414 on the client machine 410 or the shopping cart 462 on the third party server 460.

In an embodiment, a desktop manager 415 may be loaded onto a user's client machine 410 from an E-commerce server (430, 440, 450) or a third party payment server 460. Responsive to loading the desktop manager 415 onto the client machine 410, the payment server 460 may create an entry in a user table 461 for that user. Thereafter, if that same user loads the desktop manager onto another client machine, the payment server 460 may query the user if that user would like to have access to the contents of his shopping cart 462 stored on the payment server 460. If the user would like to have access to the shopping cart 462, the payment server 460 sends all of the items in the client's shopping cart 462 to the shopping cart in memory on that new client machine, according to an embodiment.

Computer System

Figure 7:
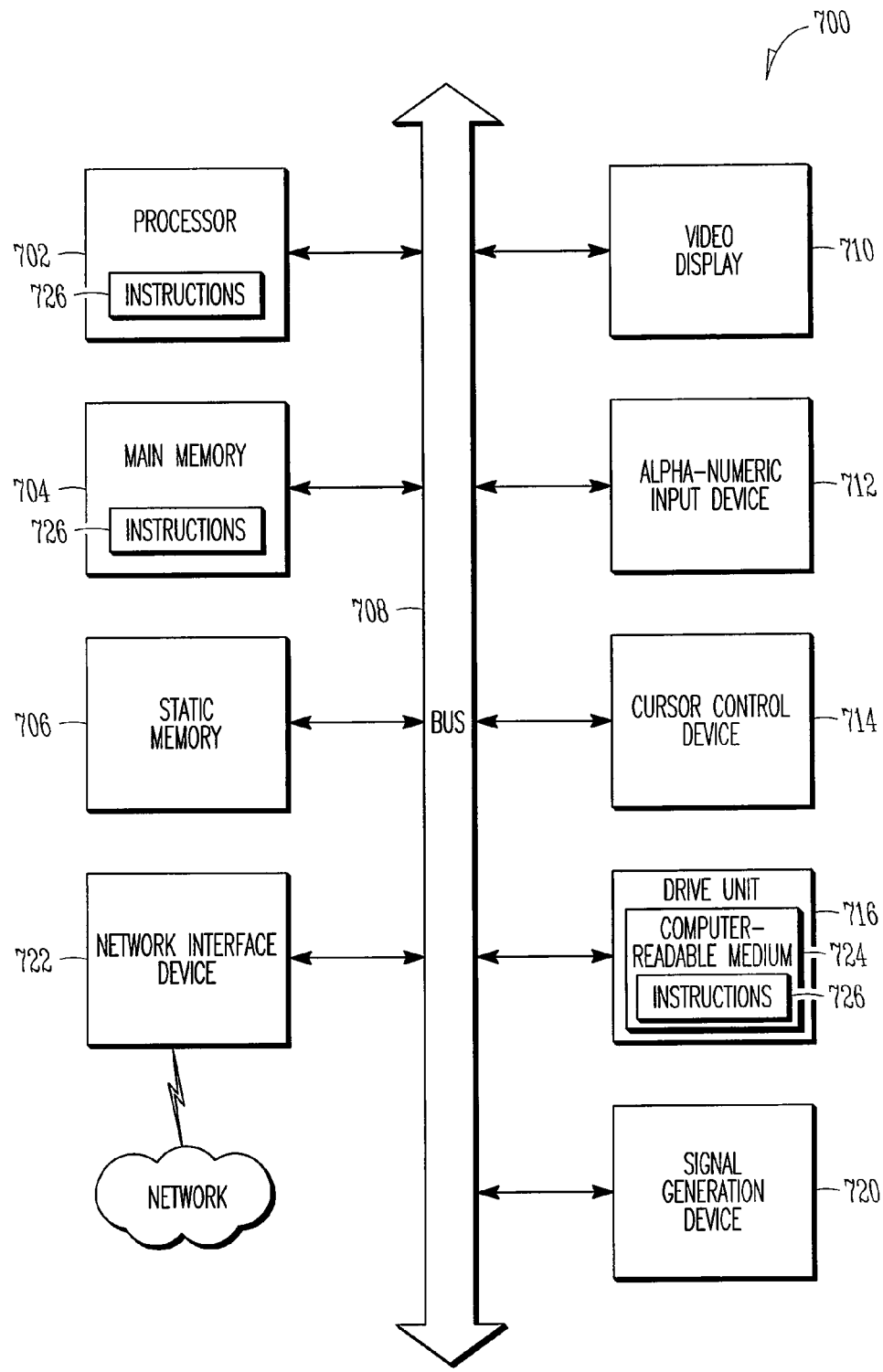
FIG. 7 shows a diagrammatic representation of a machine in the example form of a computer system within which instructions, for causing the machine to perform any one or more of the methodologies discussed herein, may be executed.

FIG. 7 shows a diagrammatic representation of a machine in the example form of a computer system 700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g. a keyboard), a cursor control device 714 (e.g. a mouse), a disk drive unit 716, a signal generation device 720 (e.g. a speaker) and a network interface device 722.

The disk drive unit 716 includes a machine-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 722. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a system and method for permitting a user on a client machine to capture information on a product from an image, and place that information into a local shopping cart on his local machine has been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
communicating from an external application a plug-in that includes a tool bar and an icon to a client machine, the plug-in configured to enable the client machine to display the tool bar and the icon and to store information relating to a plurality of items from a plurality of network-based transaction systems;
communicating a user interface to said client machine, the user interface simultaneously offering a plurality of items that are respectively offered for sale at a plurality of network-based transaction systems, wherein each of the plurality of items comprises information and an associated link;
storing the information on said client machine responsive to one or more said links being dragged to said icon; and
communicating to a payment server the information relating to at least one item from the plurality of network-based transaction systems for storage in a shopping cart on the payment server, wherein the payment server is a third party payment server;
first receiving a user logoff command by the client machine resulting in the client machine going offline from the network;
subsequent from going offline from the network, receiving by the client machine a purchase indication from the user for at least one item dragged to said icon by the client machine; and
without further user interaction:
communicating to a payment server the stored information relating to the at least one item for storage in the shopping cart on the payment server;
communicating a message from the client, machine to the payment server, said message authorizing the purchase of said at least one item;
debiting an account associated with the user by the payment server; and
receiving a message at the client machine and the plurality of said network-based transaction systems from the payment server, said received message confirming said purchase.

2. The method of claim 1, wherein said link is associated with an image.

3. The method of claim 1, wherein said network-based transaction system comprises a commerce website.

4. The method of claim 1, further comprising communicating additional messages from said network-based transaction system to said client machine, said additional messages for display on said client machine.

5. The method of claim 1, further comprising communicating messages from said network-based transaction system to said payment server, and further comprising communicating said messages from said payment server to said client machine for display on said client machine.

6. A system comprising:
a communication processor to communicate from an external application a plug-in that includes a tool bar and an icon to a client machine, the plug-in configured to enable the client machine to display the tool bar and the icon and to store information relating to a plurality of items from a plurality of network-based transaction systems;
a communication processor to communicate a user interface to said client machine, the user interface simultaneously offering a plurality of items that are respectively offered for sale at a plurality of network-based transaction systems, wherein each of the plurality of items comprises information and an associated link;
a storage medium to store the information on said client machine responsive to one or more said links being dragged to said icon;
a communication processor to transmit to a payment server the information relating to at least one item from the plurality of network-based transaction systems for storage in a shopping cart on the payment server, wherein the payment server is a third party payment server;

a processor configured for first receiving a user logoff command by the client machine resulting in the client machine going offline from the network;

subsequent from going offline from the network, a processor configured for receiving by the client machine a purchase indication from the user for at least one item dragged to said icon by the client machine; and without further user interaction:

a processor configured for communicating to a payment server the stored information relating to the at least one item for storage in the shopping cart on the payment server;

a processor configured for communicating a message from the client machine to the payment server, said message authorizing the purchase of said at least one item;

a processor configured for debiting an account associated with the user by the payment server; and a processor configured for receiving a message at the client machine and the plurality of said network-based transaction systems from the payment server, said received message confirming said purchase.

7. The system of claim 6, wherein said link is associated with an image.

8. The system of claim 6, wherein said network-based transaction system comprises a commerce website.

9. The system of claim 6, further comprising a processor to communicate additional messages from said network-based transaction system to said client machine, said additional messages for display on said client machine.

10. The system of claim 6, further comprising a communication processor to communicate messages from said network-based transaction system to said payment server, and further to communicate said messages from said payment server to said client machine for display on said client machine.

11. A tangible machine readable medium storing a set of instructions that, when executed by a machine, cause the machine to:

communicate from an external application a plug-in that includes a tool bar and an icon to a client machine, the plug-in configured to enable the client machine to display the tool bar and the icon and to store information relating to a plurality of items from a plurality of network-based transaction systems;

communicate a user interface to said client machine, the user interface simultaneously offering a plurality of items that are respectively offered for sale at a plurality of network-based transaction systems, wherein each of the plurality of items comprises information and an associated link;

store the information on said client machine responsive to one or more said links being dragged to said icon;

communicate to a payment server the information relating to the at least one item from the plurality of network-based transaction systems for storage in a shopping cart on the payment server, wherein the payment server is a third party payment server first receiving a user logoff command by the client machine resulting in the client machine going offline from the network;

subsequent from going offline from the network, receiving by the client machine a purchase indication from the user for at least one item dragged to said icon by the client machine; and without further user interaction:

communicating to a payment server the stored information relating to the at least one item for storage in the shopping cart on the payment server;

communicating a message from the client machine to the payment server, said message authorizing the purchase of said at least one item;

debiting an account associated with the user by the payment server; and receiving a message at the client machine and the plurality of said network-based commerce systems from the payment server, said received message confirming said purchase.

12. A system, the system comprising:

a first means for communicating from an external application a plug-in that includes a tool bar and an icon to a client machine, the plug-in configured to enable the client machine to display the tool bar and the icon and to store information relating to a plurality of items from a plurality of network-based transaction systems;

a second means for communicating a user interface to said client machine, the user interface simultaneously offering a plurality of items that are respectively offered for sale at a plurality of network-based transaction systems, wherein each of the plurality of items comprises information and an associated link;

a third means for storing the information on said client machine responsive to one or more said links being dragged to said icon;

a fourth means for communicating to a payment server the information relating to at least one item from the plurality of network-based transaction systems for storage in a shopping cart on the payment server, wherein the payment server is a third party payment server; and a fifth means for first receiving a user logoff command by the client machine resulting in the client machine going offline from the network;

subsequent from going offline from the network, a sixth means for receiving by the client machine a purchase indication from the user for at least one item dragged to said icon by the client machine; and without further user interaction:

a seventh means for communicating to a payment server the stored information relating to the at least one item for storage in the shopping cart on the payment server;

an eighth means for communicating a message from the client machine to the payment server, said message authorizing the purchase of said at least one item;

a tenth means for debiting an account associated with the user by the payment server; and an eleventh means for receiving a message at the client machine and the plurality of said network-based commerce systems from the payment server, said received message confirming said purchase.

13. A method comprising:

communicating, to a first machine, an external application that includes a plug-in that operationally displays a tool bar and an icon to a user of the first machine, the application further configured to store information relating to a plurality of items from a plurality of network-based transaction systems;

communicating, to the first machine, a user interface that includes offering description information and offering identification information, the offering identification information comprising information associated with an offering for sale on a network-based transaction system;

receiving association information to associate the offering description information with the icon;

storing, on the first machine, the offering identification information responsive to the receipt of the association information;

communicating to a payment server the information relating to at least one item from the plurality of network-based transaction systems for storage in a shopping cart on the payment server, wherein the payment server is a third party payment server;

subsequent from going offline from the network, receiving by the client machine a purchase indication from the user for at least one item dragged to said icon by the client machine; and without further user interaction:
communicating to a payment server the stored information relating to the at least one item for storage in the shopping cart on the payment server;
communicating a message from the client machine to the payment server, said message authorizing the purchase of said at least one item;
debiting an account associated with the user by the payment server; and
receiving a message at the client machine and the plurality of said network-based transaction systems from the payment server, said received message confirming said purchase.

14. The method of claim 13, wherein the receiving of the association information includes detecting a user dragging, on the first machine, of the offering description information to the icon.

15. The method of claim 13, wherein the offering identification information comprises a link to a listing for the offering as published by the network-based commerce system.

16. The method of claim 13, wherein the offering identification information is an image, and the link is associated with the image.

17. A system comprising:
a communication processor to communicate, to a first machine, an external application including a plug-in that operationally displays a tool bar and an icon to a user of the first machine, the application further configured to store information relating to a plurality of items from a plurality of network-based transaction systems;
a communication processor to communicate, to the first machine, a user interface, the user interface simultaneously offering a plurality of items that are respectively offered for sale at a plurality of network-based transaction systems, wherein each of the plurality of items comprises information and an associated link;
a storage medium to store, on the first machine, the information on the first machine responsive to one of more links being dragged to the icon;
a communication processor to transmit to a payment server the information relating to the plurality of items from the plurality of network-based transaction systems for storage in a shopping cart on the payment server, wherein the payment server is a third party payment server;
a processor configured for first receiving a user logoff command by the client machine resulting in the client machine going offline from the network;
subsequent from going offline from the network, a processor configured for receiving by the client machine a purchase indication from the user for at least one item dragged to said icon by the client machine; and without further user interaction:
a processor configured for communicating to a payment server the stored information relating to the at least one item for storage in the shopping cart on the payment server;
a processor configured for communicating a message from the client machine to the payment server, said message authorizing the purchase of said at least one item;
a processor configured for debiting an account associated with the user by the payment server; and
a processor configured for receiving a message at the client machine and the plurality of said network-based transaction systems from the payment server, said received message confirming said purchase.

18. The system of claim 17, wherein the icon is an image, and the link is associated with the image.

19. A method comprising:
enabling a user to browse a plurality of network-based transaction sites;
enabling the user to select a plurality of items from the plurality of network-based transaction sites;
enabling the user to store the plurality of items on a client machine; and
enabling the user to purchase one or more of the plurality of items stored on the client machine;
wherein the enabling the user to store the plurality of items comprises:
communicating from an external application a plug-in that includes a tool bar and an icon to the client machine, the plug-in configured to enable the client machine to display the tool bar and the icon and to store information relating to a plurality of items from a plurality of network-based transaction systems;
communicating a user interface to the client machine, the user interface simultaneously offering a plurality of items that are respectively offered for sale at a plurality of network-based transaction systems, wherein each of the plurality of items comprises information and an associated link;
storing the information on the client machine responsive to one or more links being dragged to the icon;
communicating to a payment server the information relating to at least one item from the plurality of network-based commerce systems for storage in a shopping cart on the payment server, wherein the payment server is a third party payment server;
first receiving a user logoff command by the client machine resulting in the client machine going offline from the network;
subsequent from going offline from the network, receiving by the client machine a purchase indication from the user for at least one item dragged to said icon by the client machine; and
without further user interaction:
communicating to a payment server the stored information relating to the at least one item for storage in the shopping cart on the payment server;
communicating a message from the client machine to the payment server, said message authorizing the purchase of said at least one item;
debiting an account associated with the user by the payment server; and
receiving a message at the client machine and the plurality of said network-based commerce systems from the payment server, said received message confirming said purchase.

20. The method of claim 19, comprising:
enabling the user to terminate a browsing session; and
enabling the user to initiate another browsing session, access the stored plurality of items, and purchase one or more of the plurality of items.

21. The method of claim 20, comprising:
transmitting a message to one or more network-based transaction sites in order to retrieve current information relating to the at least one item.

22. The method of claim 21, wherein the transmitting the message to the one or more network-based transaction sites occurs during the another browsing session.

23. The method of claim 21, comprising:
transmitting a message to the payment server; and
receiving at the client machine a message from the payment server.

24. The method of claim 19, comprising:
enabling a user to examine the shopping cart on the client machine, the shopping cart including the plurality of items from a plurality of network-based transaction sites; and
automatically serially logging onto one or more of the plurality of network-based transaction sites to retrieve current information regarding one or more of the plurality of items.

25. The method of claim 19, comprising enabling a user to create the shopping cart on the payment server.

26. A method facilitating transaction automation comprising:
receiving by a client machine a plug-in from an external application that includes a tool bar and an icon, wherein the plug-in displays the tool bar and the icon and stores information relating to a plurality of items from a plurality of network-based commerce systems;
receiving at the client machine a user interface, the user interface simultaneously offering a plurality of items that are respectively offered for sale by the plurality of network-based commerce systems, wherein each of the plurality of items for sale comprises information and an associated link;
storing the information on said client machine responsive to the one or more said links being dragged to said icon;
communicating to a payment server the stored information relating to at least one item from the plurality of network-based commerce systems for storage in a shopping cart on the payment server, wherein the payment server is a third party payment server;
first receiving a user logoff command by the client machine resulting in the client machine going offline from the network;
subsequent from going offline from the network, receiving by the client machine a purchase indication from the user for at least one item dragged to said icon by the client machine; and
without further user interaction:
  communicating to a payment server the stored information relating to the at least one item for storage in the shopping cart on the payment server;
  communicating a message from the client machine to the payment server, said message authorizing the purchase of said at least one item;
  debiting an account associated with the user by the payment server; and
  receiving a message at the client machine and the plurality of said network-based commerce systems from the payment server, said received message confirming said purchase.

27. The method of claim 26, wherein said link is associated with an image.

28. The method of claim 26, further comprising communicating additional messages from said network-based commerce system to said client machine, said additional messages for display on said client machine.

29. The method of claim 26, further comprising communicating messages from said network-based commerce system to said payment server, and further comprising communicating said messages from said payment server to said client machine for display on said client machine.

* * * * *

UNITED STATES PATENT AND TRADEMARK OFFICE
CERTIFICATE OF CORRECTION

PATENT NO. : 7,877,295 B2  
APPLICATION NO. : 11/286600  
DATED : January 25, 2011  
INVENTOR(S) : Matthew Mengerink et al.

Page 1 of 1

It is certified that error appears in the above-identified patent and that said Letters Patent is hereby corrected as shown below:

On Drawing Sheet 1 of 7, Reference Numeral 24, Figure 1, line 1, delete "SEARCH INDEXER SERVER" and insert -- SEARCH INDEX SERVER --, therefor.

In column 8, line 25, in Claim 1, delete "client," and insert -- client --, therefor.

In column 11, line 54, in Claim 17, delete "one of more" and insert -- one or more --, therefor.

Signed and Sealed this  
Twenty-second Day of March, 2011

David J. Kappos  
*Director of the United States Patent and Trademark Office*